(12) United States Patent
Deutsch et al.

(10) Patent No.: US 6,258,396 B1
(45) Date of Patent: Jul. 10, 2001

(54) METHOD OF MANUFACTURING AN EXPANDED CEREAL

(75) Inventors: Roman Deutsch, Lutry; Ernst Heck, Vufflens-la-Ville; Jean-Pierre Martin, Villars-Burquin, all of (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/559,544

(22) Filed: Apr. 28, 2000

(30) Foreign Application Priority Data

Apr. 30, 1999 (EP) .................................................. 99201367

(51) Int. Cl.[7] .......................................................... A23L 1/00
(52) U.S. Cl. ............................................ 426/516; 426/449
(58) Field of Search .................................. 426/516, 448, 426/449; 425/204

(56) References Cited

U.S. PATENT DOCUMENTS

| 3,139,342 | 6/1964 | Liuskey | 99/2 |
| 3,476,567 | 11/1969 | Wood et al. | 99/82 |
| 3,482,992 | 12/1969 | Benson | 99/81 |
| 4,290,989 | 9/1981 | Topor et al. | 264/142 |
| 4,748,037 | * | 5/1988 | Matsumoto et al. | 426/516 |
| 4,814,196 | 3/1989 | Taguchi | 426/643 |
| 4,900,572 | * | 2/1990 | Repholz et al. | 426/516 |

FOREIGN PATENT DOCUMENTS

| 0 898 890 A1 | 8/1997 | (EP) . |
| 2 572 013 | 10/1984 | (FR) . |
| WO 98/49902 | 11/1998 | (WO) . |

\* cited by examiner

*Primary Examiner*—George C. Yeung
(74) *Attorney, Agent, or Firm*—Winston & Strawn

(57) ABSTRACT

A process for manufacturing an expanded cereal with the overall shape of an array of touching balls and an extrusion die and an extruder for use with the process. The die includes a feed ring for receiving material from an extruder, a cylindrical distribution chamber having a front wall and rear wall which includes the feed ring, and an array of parallel extrusion tubes provided in the front wall of the distribution chamber. The feed ring is in communication with the array of parallel extrusion tubes through the distribution chamber. The distribution chamber also includes a cylindrical distribution insert that extends axially from the center of the feed ring towards the front wall but spaced from the array of extrusion tubes. The process involves cooking and extruding a mixture of starchy material, sugar, oil, and water in a cooker-extruder and forcing the cooked material through the extrusion die.

22 Claims, 4 Drawing Sheets

METHOD OF MANUFACTURING AN EXPANDED CEREAL

FIELD OF THE INVENTION

The present invention is directed to an extrusion die, an extruder comprising the extrusion die, a method for manufacturing an expanded cereal using the extrusion die, and an expanded cereal that is obtained by extrusion through the die.

BACKGROUND

EP 0,898,890 describes an extrusion die for producing a product that has the overall shape of a nucleus surrounded by a ring. The product is obtained by extruding a single substance through a die having a feed orifice plate that opens into an extrusion chamber that is divided into two concentric chambers by a separating cone. The position of the cone can be adjusted relative to the outer casing of the die. This adjusts the relative size of the extrusion openings and hence the size of the nucleus and outer ring.

U.S. Pat. No. 2,858,218 describes a cereal in the form of flakes which has a relief comparable to the surface of a raspberry, and a method for obtaining such a cereal. The method involves cooking a mixture of cereal and water at atmospheric pressure, extruding the resulting cooked paste, using a piston to drive the cooked paste through a die having a number of holes to form parallel filaments of the cooked paste, combining the filaments, laterally compressing the bundle in a tubular extension of the die so that filaments stick together and form a cylinder, drying the cylinder, cutting the cylinder transversely into thin slices, and causing the slices to swell under the action of heat.

U.S. Pat. No. 3,482,992 describes a cereal in the form of flakes made up of touching pieces, the intersection where the pieces meet being colored, and a method for obtaining such a cereal. The method involves cooking a mixture of cereal and water in a cooking device to provide a cooked paste; extruding the cooked paste through a die which has a number of circular outlet orifices, in particular six holes arranged in a circle around a central hole; and injecting a colorant through small intermediate holes to form parallel strands of cooked paste which are colored at their interface. The strands are combined into a bundle and compressed laterally in a tubular extension of the die so that they stick together and form a composite strand. The diameter of the strand is then reduced by drawing it longitudinally and the strand is cut transversely into thin slices. The slices are dried and made to swell under the action of heat.

The object of the present invention is to provide an extrusion die that makes it possible to produce an expanded cereal with a particularly attractive three-dimensional shape, the three-dimensional shape being an array of touching balls.

SUMMARY OF THE INVENTION

The present invention relates to an extrusion die to prepare an expanded cereal. The extrusion die includes a feed ring for receiving material from an extuder; a cylindrical distribution chamber having a front wall and a rear wall that includes the feed ring; an array of parallel extrusion tubes provided in a front wall of the distribution chamber, wherein the array of parallel extrusion tubes is in communication with the feed ring through the distribution chamber; and a cylindrical distribution insert that extends axially from the center of the feed ring towards the front wall but is spaced from the array of tubes.

The array of parallel extrusion tubes may include between about 12 to 30 tubes. The tubes of the array may have a cross sectional shape that is one or more of a circle, oval, polygon, triangle, square, rectangle, or trapezoid. The tubes may be aligned along one or more axes or curves when viewed in cross section. The dimensions of the cross section of each tube may be between about 1 and 4 mm and the area of the cross section of each tube may be between about 1 and 16 $mm^2$. The distance between two adjacent tubes in the array may be between about 0.2 and 0.6 mm. The array of parallel extrusion tubes may be in two groups with parallel intersecting axes.

The invention also relates to an extruder that includes an elongated barrel, one or two processing screws within the elongated barrel, at least one extrusion die as described above, and a cutting means.

In one embodiment the extruder has more than one die. In this embodiment the barrel has an upstream end and a downstream end, wherein the downstream end of the barrel is secured to a front plate provided with an orifice that is in communication with the barrel, the front plate is attached to a second plate having an opening that is in communication with the orifice of the front plate, and a bell-shaped pre-distribution chamber, wherein the bell shaped distribution chamber is attached to the second plate and is in communication with the opening of the second plate and is in communication with the feed rings of the extrusion die; and the cutting means is a rotary cutter that rotates against the outlet orifices of the extrusion tubes.

The invention also relates to a method of manufacturing an expanded cereal with the overall shape of an array of touching balls. The method involves the steps of providing a cooker-extruder having an elongated barrel with one or two processing screws within the elongated barrel with a mixture of between about 60 and 90 parts by weight of a starchy material, up to 15 parts by weight of sugar, up to 10 parts by weight of oil, and a sufficient amount of water so that the mixture has a water content of between about 15 and 25 percent by weight; cooking the mixture under positive pressure in the cooker-extruder to provide a thermoplastic substance; extruding the thermoplastic substance through at least one die having an array of parallel extrusion tubes each having an outlet orifice so that the thermoplastic substance expands when it exits the outlet orifices of the extrusion tubes to provide a bundle of strands of expanded thermoplastic substance that stick together; and cutting the bundle into slices as they exit from the outlet orifices of the extrusion tubes to provide an expanded cereal.

The cooking may be conducted at a temperature of between about 105° C. and 180° C., a pressure of between about 40 and 180 bar, a rotation speed for the one or more screws of between about 240 and 370 rpm, and wherein the ratio of the length of the screw to the diameter of the screw is between about 9 and 24. The coefficient of expansion for the extruded strands may be between about 2 and 4. The extruded strands may have a porous texture. The extruded strands may have a residual water content of between about 5 and 12 percent and may be further dried to a water content of between about 1 and 3 percent.

The starchy material may be one or more of a flour selected from the group consisting of wheat, barley, rice, and corn flour or a starch selected from the group consisting of wheat, barley, rice, tapioca, potato, and corn starch. The sugar may be one or more of sucrose, glucose, or fructose. The oil may be present in an amount of between about 4 and 10 percent by weight and may be a butter oil or a vegetable oil. The mixture further include up to 1.5 parts of calcium that may be provided by calcium carbonate or calcium triphosphate or one or more vitamins, trace elements, sodium chloride colorings, or flavorings.

The invention further relates to an expanded cereal prepared by the method of the invention. The expanded cereal product may be coated with one or more of a chocolate coating, a sugar syrup, a fruit syrup, a honey syrup, or a coating that contains one or more vitamins or flavorings.

BRIEF DESCRIPTIONS OF THE DRAWINGS

DETAILED DESCRIPTION OF THE PREFERRED EMBODIMENTS

Figure 1:
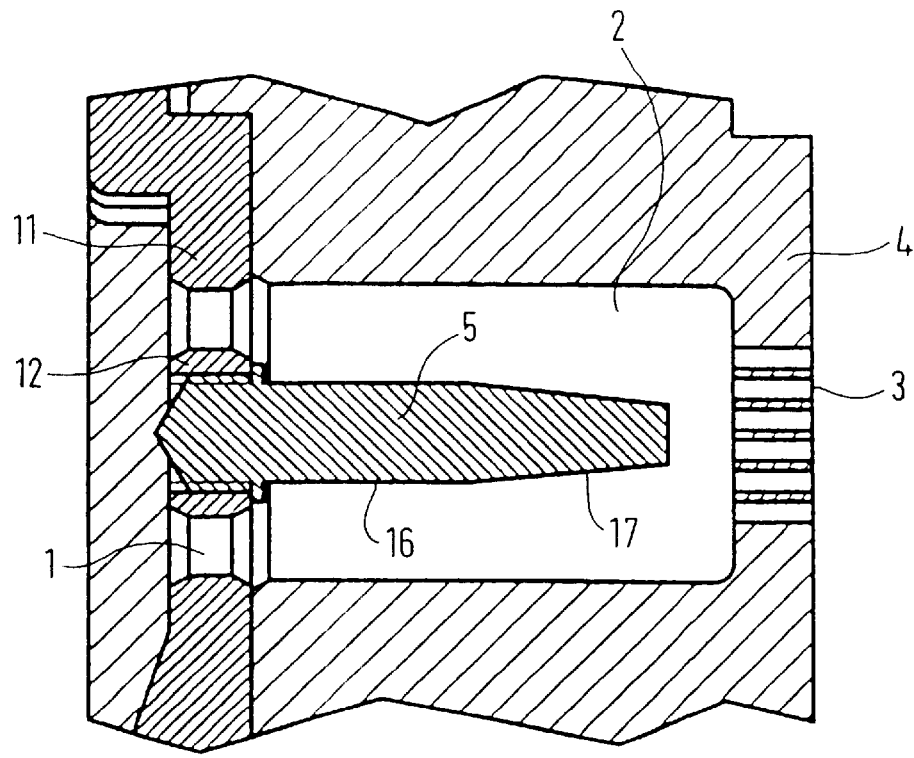
FIG. 1 is an axial view of one embodiment of the die of the invention.

The extrusion die of the invention is depicted in FIG. 1. The extrusion die comprises a feed ring 1 that forms the rear wall of a cylindrical distribution chamber 2 and opens into the cylindrical distribution chamber 2. The cylindrical distribution chamber 2 communicates with an array of parallel extrusion tubes 3 provided in a front wall 4 of the cylindrical distribution chamber 2. A cylindrical distribution insert 5 extends axially from the center of the feed ring 1 towards the front wall but is spaced from the front wall. Preferably, the space between the cylindrical distribution insert 5 and the front wall is between about 1 and 5 mm.

The feed ring 1 may be, for example in the form of two concentric annuli 11 and 12 connected by juxtaposed tubular hoops 13. The number of tubular hoops may vary from between about 4 and 20, preferably between about 5 and 12.

The cylindrical distribution insert 5 has a first cylindrical upstream part 16 and a second frustoconical downstream part 17. The cylindrical distribution insert 5 evens out the rate of displacement across the width of the extrusion front when a thermoplastic material is extruded through the cylindrical distribution chamber. The cylindrical distribution insert 5 assures that the flow of material through the array of tubes is distributed homogeneously in front of the array. By homogeneously is meant there are no preferential paths for the material being extruded to follow and that the flow of material has substantially the same speed in front of each individual tube of the array. The width of the extrusion front corresponds to the width or diameter of the array of parallel extrusion tubes.

Figure 4:
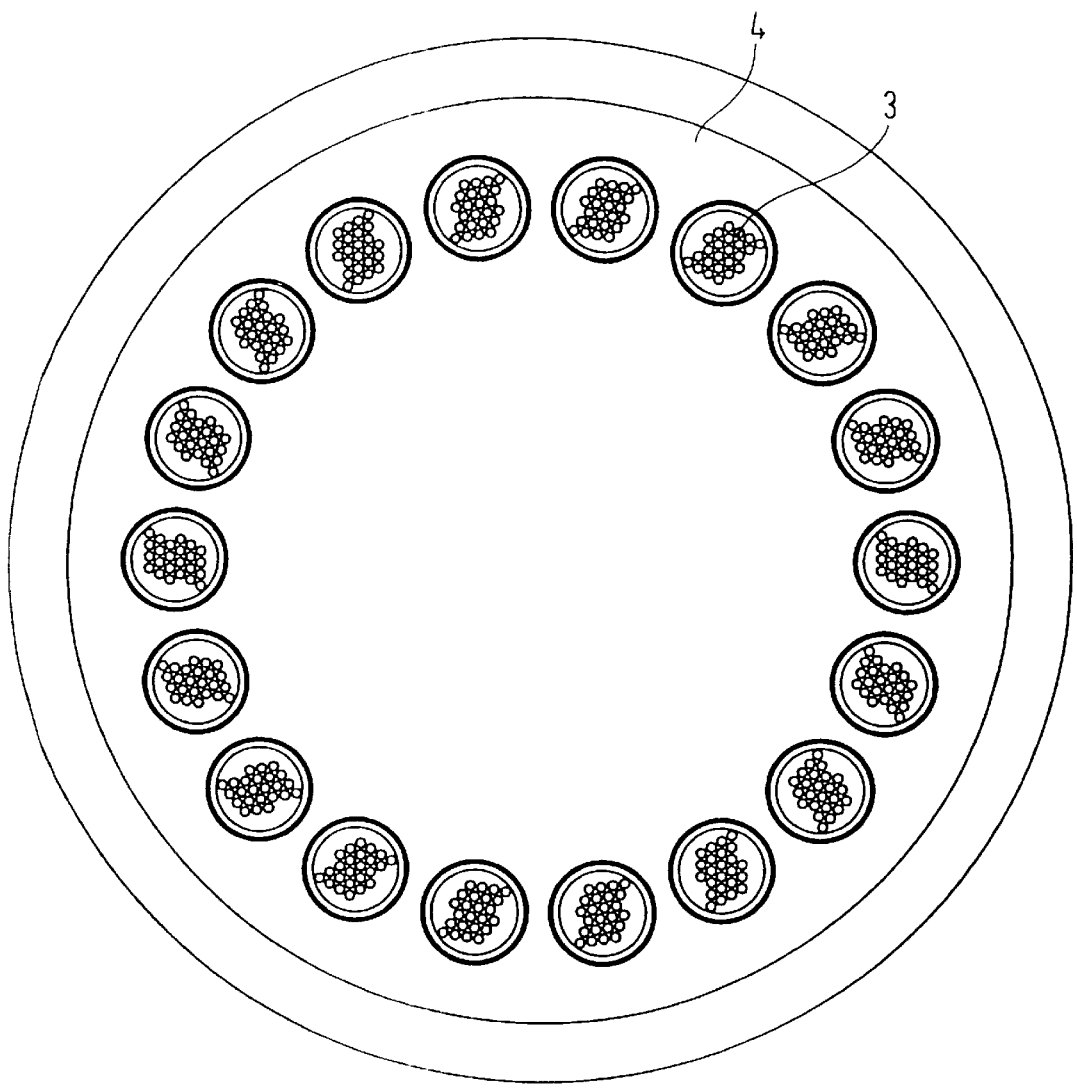
FIG. 4 is a face view of the extruder depicted in FIG. 3.

The array of extrusion tubes 3 is an array of several individual cylindrical parallel tubes. The array may comprise from about 2 to 40 tubes, preferably from about 12 to 30 tubes. The individual tubes of the array may have cross sections in a variety of shape including, but not limited to a, circle, oval, polygon, triangle, square, rectangle, and trapezoid. The shape and size of the cross section of the individual tubes in any given array may be the same or different. Preferably, the tubes are arranged so that they are aligned along a number of axes or curves when viewed in cross section. The tubes, however, may also be arranged randomly and in no particular order. The cross section of the tubes may have dimensions, i.e., diameters, lengths, or widths of between about 1 and 4 mm. Preferably, the cross section of the tubes has a surface area or aperture of between about 1 and 16 $mm^2$. Preferably, the tubes are relatively close together. The distance between two tubes of the array may be from about 0.2 to 0.6 mm. In a preferred embodiment 24 cylindrical tubes each having the same circular cross section are arranged in two groups with parallel axes intersecting at angles as depicted in FIG. 4.

The extruder of the invention comprises an elongated barrel containing one or two processing screws, at least one extrusion die of the invention, and a cutting means.

The phrase "processing screw" means an extrusion screw rotating inside the bore of a barrel or two extrusion screws rotating inside of two secant bores of a barrel. The screws have processing members such as flights helically wound about their axis. The configuration, pitch, depth, and hand of the flights may be configured in various ways along the axis of the screw so as to define zones for various processing operations such as conveying, wetting, mixing, shearing, compressing, and/or cooking. The processing crews may be made as a single piece or by assembling various processing members by successively slipping the processing members onto a spindle.

The cutting means cuts the extrudate as it emerges from the outlet orifices of the extrusion tubes. Preferably, the cutting means is a rotary cutter 14 that rotates against the outlet orifices of the extrusion tubes 3 of the array, i.e., against the front wall of the die. The rotating cutter may have one blade or a number of blades, preferably the rotating cutter has between about 2 and 4 blades.

Figure 2:
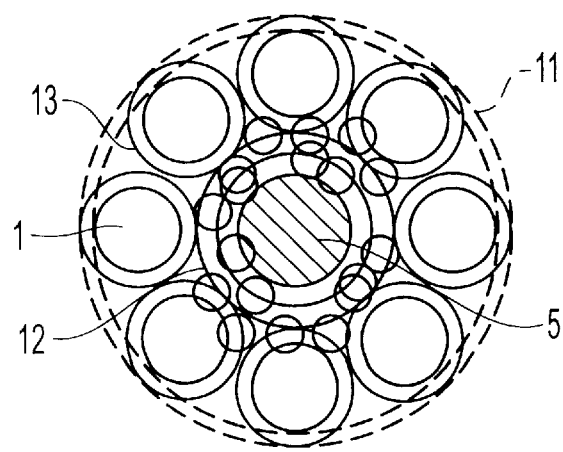
FIG. 2 is a cross section view of the die depicted in FIG. 1.
Figure 3:
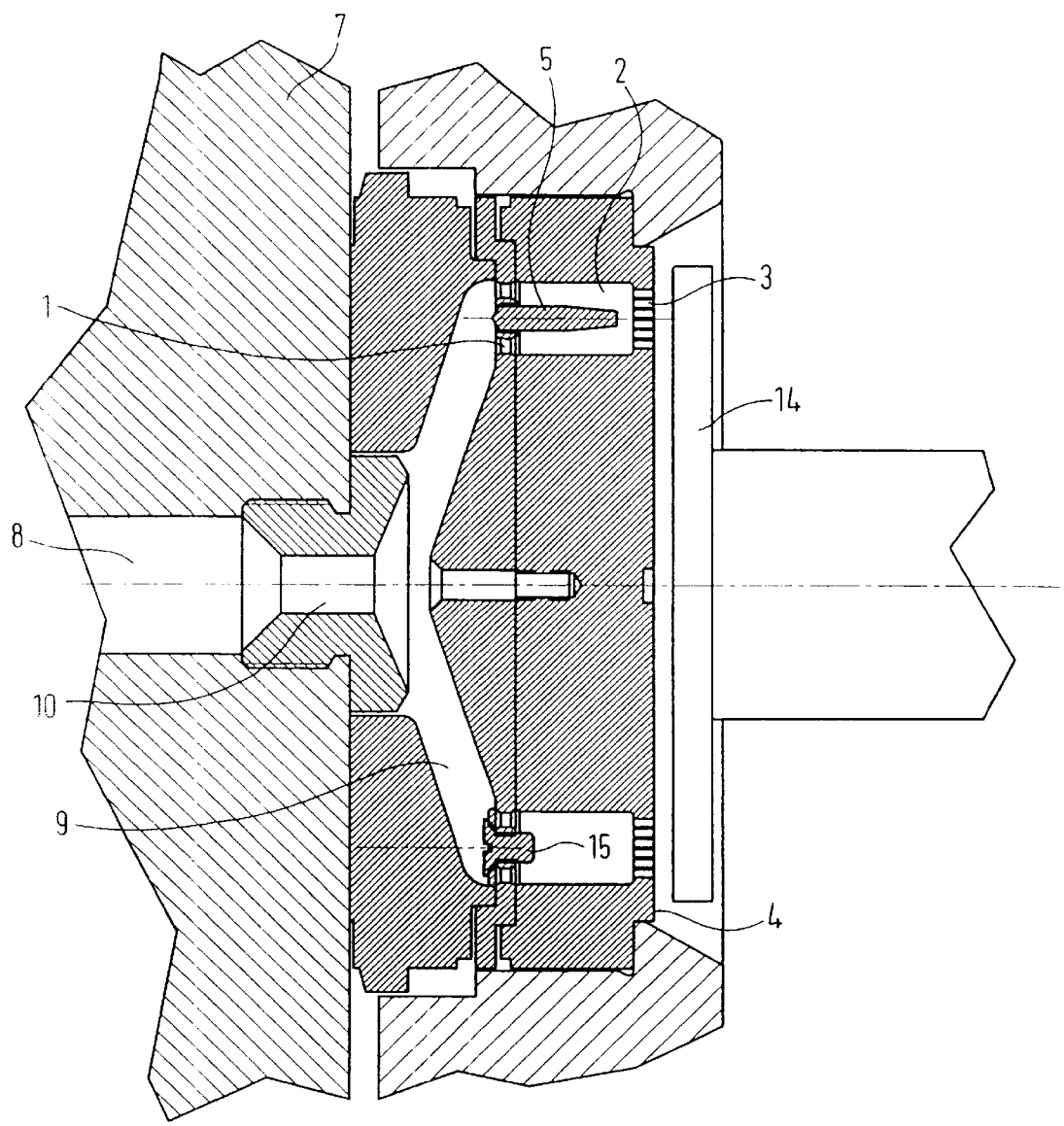
FIG. 3 is a partial cross section view of one embodiment of an extruder comprising a number of dies.

The extruder may include several extrusion dies such as those depicted in FIGS. 1 and 2. FIGS. 3 and 4, depict an embodiment of the invention wherein the extruder comprises a number of extrusion dies. In FIG. 3 the downstream end of the elongated extrusion barrel ends at a front plate 7 that is provided with an orifice 8 that is in communication with the barrel. The front plate 7 is attached to a second plate 15 having an opening 10 that is in communication with the opening 8 in the front plate 7 and is in communication with a bell shaped pre-distribution chamber 9. The pre-distribution chamber 9 communicates with the distribution chambers 2 of the dies via the feed rings 1. Preferably, the extruder has between about 2 and 30 dies.

By downstream end of the extruder is meant the end of the extruder closest to the extrusion die. By upstream end of the extruder is meant the end of the extruder most distant from to the extrusion die. The overall flow of material in the extruder is from the upstream end towards the downstream end.

When the extruder has several dies, the number of dies that can be used can be adjusted according to the output of the extruder. For example, one die in two or one die in three can be closed by blocking the dies feed ring 1 with a cover. The cover is fixed to the dies center and replaces the distribution insert 5. FIG. 3 depicts an extruder wherein the lower die is blocked by replacing the distribution insert 5 with a cover 15 to block the feed ring 1 of the die.

The extruder of the invention can be used to prepare a cereal that has the overall shape of an array of touching balls. The touching balls of the array may be of similar or different shapes, preferably they are round and/or elongated. The touching balls may be aligned or may not be aligned along an axes or a curve. The array may have an overall thickness of between about 4 and 16 mm. The overall shape of the array may be flat or it may be somewhat curved. A variety of shapes are possible for the overall periphery of the array. Preferably the shape of the periphery of the array is square, rectangular, circular, or oval, modulated by the bumps formed by the balls located at the edges.

The cereal of the invention may be used to manufacture a variety of products such as, for example, breakfast cereals, crunchy pet food, and the like.

When the cereal of the invention is a breakfast cereal it can be eaten as it is or it may be coated. Suitable coatings for use with the cereal of the invention include, but are not limited to, a chocolate coating, a sugar syrup, a fruit syrup, a honey syrup, and a coating containing vitamins and flavorings.

Figure 5:
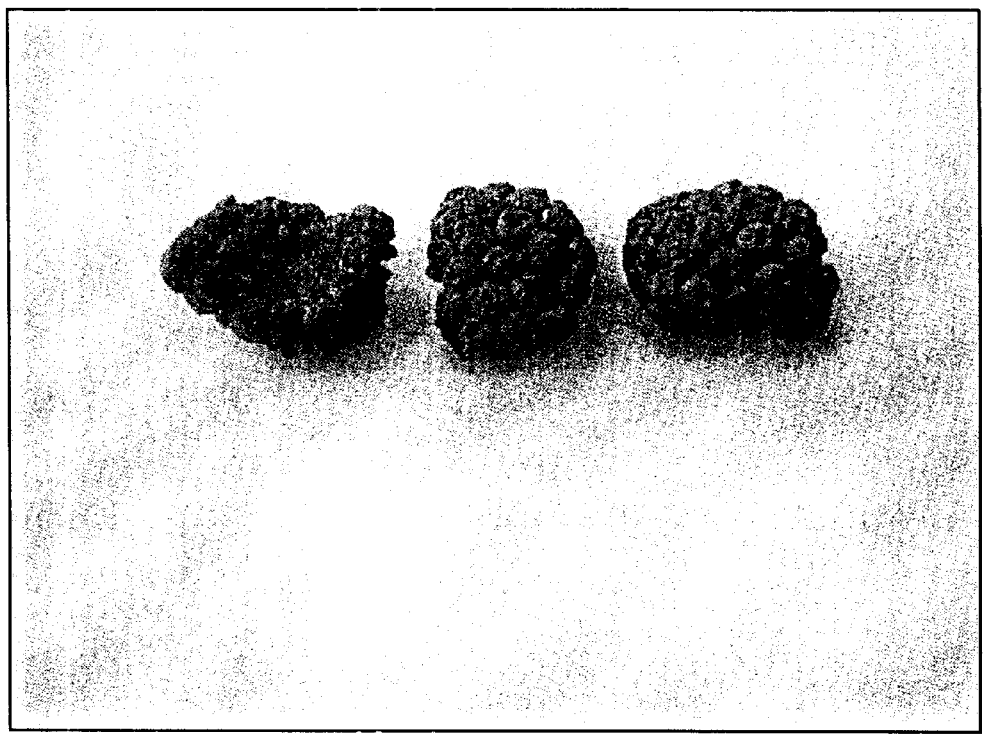
FIG. 5 is a photograph showing one embodiment of the cereal from three different angles.

FIG. 5 depicts one embodiment of the cereal that can be obtained by extrusion through a die similar to those depicted in FIGS. 1 and 4.

In this embodiment, the cereal has the overall shape of an array of touching balls of the same round shape and of the same dimensions aligned in two groups with parallel axes intersecting at angles. The array of balls has a periphery of overall rectangular shape but is slightly curved on one side (the side where the cutter detached the cereal from the composite strand leaving the die).

The cereal, having the overall shape of an array of touching balls, is prepared by forming a mixture comprising between about 60 and 90 parts by weight of a starchy material, up to about 15 parts by weight of sugar, and up to about 10 parts by weight of oil, and adding sufficient water to provide a water content of between about 15 to 25 percent by weight. The resulting mixture is then cooked, extruded, and expanded at a pressure of between about 40 to 180 bar and a temperature between about 105° C. and 180° C. The mixture is extruded through at least one die comprising an array of parallel extrusion tubes so as to obtain a bundle of strands of expanded thermoplastic substance that stick together. The bundle is then cut into slices at the outlet orifices of the extrusion tubes.

The starchy material may be a cereal flour including, but not limited to, one or more of wheat, barley, rice, or corn flour. The starch material may also be a starch including, but not limited to, one or more of wheat, barley, rice, tapioca, potato, or corn starch.

Any sugar suitable for manufacturing cereal may be used according to the method of the invention. For example, the sugar may be sucrose, glucose or fructose.

The oil is preferably added in the proportion of between about 4 and 10 parts by weight. Oils that may be used in the method of the invention include, but are not limited to, butter oil and vegetable oils such as palm nut oil.

The mixture may further contain up to 1.5 parts of calcium, for example, in the form of calcium carbonate or calcium triphosphate.

The mixture may further include other additives including, but not limited to, vitamins, trace elements, sodium chloride, colorings, and artificial or natural flavorings such as cocoa. For example, up to 6 parts of cocoa may be added.

The cooking and extrusion may be performed in a cooker-extruder having a screw with a length to diameter ratio of between about 9 and 24, with the screws rotating at between about 240 and 370 rpm, at a pressure in the range of about 40 and 180 bar, and at a temperature in the range of about 105° C. to 180° C. The cooked and extruded mixture expands as it exits the cooker-extruder due to the decrease in pressure. Preferably the extruded strands exhibit an expansion coefficient for the extruded strands of between about 2 and 4. By "expansion coefficient" is meant the increase in volume of the mixture after it exits the die relative to the volume of the mixture before it goes through the die.

Water escapes from the thermoplastic mass in the form of steam during expansion so that the extruded strands have a porous texture. The residual water content of the extruded strands is preferably between about 5 and 12 percent.

The resulting expanded cereal may be further dried. Preferably, the cereal is dried by passing it continuously through a hot air oven until the residual water content is reduced to between about 1 to 3 percent.

EXAMPLES

The invention is further defined by reference to the following examples describing in detail the production of a preferred form of the cereal of the invention, an expanded breakfast cereal. The example is representative, and should not be construed to limit the scope of the invention in any way.

The cereal is prepared by cooking and extruding a mixture based on flour and water in a cooker-extruder comprising several dies according to the invention. In the following example, as in the entirety of this description, parts and percentages are given by weight.

A twin-screw cooker-extruder comprising several dies similar to the one illustrated in FIGS. 3 and 4 was used to produce expanded cereals with the shape of an array of touching round balls as illustrated in FIG. 5.

A mixture with the following composition was prepared (in parts, except for the added water):

| | |
|---|---|
| Rice flour | 40 |
| Corn flour | 12 |
| Wheat flour | 22 |
| Sucrose | 10 |
| Palm nut oil | 5 |
| Salt/spices | 3 |
| Water (added to a water content of 18 percent) | |

The dry powders were first mixed and the resulting dry mixture, the oil, and the water added to a CLEXTRAL type BC-72 twin-screw extruder equipped with a screw having a diameter of 88 mm and a length of 900 mm. The resulting mixture was mixed in the extruder.

The mixture was then cooked and extruded at a temperature of about 170° C. and a pressure of between about 100 and 120 bar, with the extruder screws rotating at 310 rpm.

The resulting thermoplastic mass was extruded through 6 arrays of 24 extrusion tubes, the extrusion tubes having a diameter of 1.3 mm and the distance between two tubes being 0.3 mm.

The thermoplastic mass was extruded into the ambient space and immediately cut into slices using a four-bladed cutter rotating against the front wall of the dies at a speed of 800 rpm.

The resulting cereal had the overall shape of an array of 24 touching balls with the same round shape and the same dimensions and aligned in two groups having parallel axes that intersect at angles. The array of balls had a periphery with an overall rectangular shape that was slightly curved on the side where the cutter detached the cereal from the composite strand leaving the die.

The cereal had a thickness of about 6 mm, a width of about 15 mm, and a length of about 20 mm.

What is claimed is:

1. A method of manufacturing an expanded cereal with the overall shape of an array of touching balls comprising:

providing a cooker-extruder comprising an elongated barrel with one or two processing screws within the elongated barrel with a mixture comprising between about 60 and 90 parts by weight of a starchy material, up to 15 parts by weight of sugar, up to 10 parts by weight of oil, and a sufficient amount of water so that the mixture has a water content of between about 15 and 25 percent by weight;

cooking the mixture under positive pressure in the cooker-extruder to provide a thermoplastic substance;

extruding the thermoplastic substance through at least one die comprising an array of parallel extrusion tubes each having an outlet orifice so that the thermoplastic substance expands when it exits the outlet orifices of the extrusion tubes to provide a bundle of strands of expanded thermoplastic substance that stick together; and cutting the bundle into slices as they exit from the outlet orifices of the extrusion tubes to provide an expanded cereal having an overall shape of an array of touching balls.

2. The method of claim 1, wherein the cooking is conducted at a temperature of between about 105° C. and 180° C., a pressure of between about 40 and 180 bar, a rotation speed for the one or more screws of between about 240 and 370 rpm, and wherein the screw has a length to diameter ratio between about 9 and 24.

3. The method of claim 1, wherein the coefficient of expansion for the extruded strands is between about 2 and 4.

4. The method of claim 1, wherein the extruded strands have a porous texture.

5. The method of claim 1, wherein the extruded strands have a residual water content of between about 5 and 12 percent.

6. The method of claim 1, further comprising drying the extruded strands to a water content of between about 1 and 3 percent.

7. The method of claim 1, wherein the starchy material comprises one or more of a flour selected from the group consisting of wheat, barley, rice, and corn flour or a starch selected from the group consisting of wheat, barley, rice, tapioca, potato, and corn starch; the sugar comprises one or more sugars selected from the group consisting of sucrose, glucose, and fructose; and the oil is present in an amount of between about 4 and 10 percent by weight and is a butter oil or a vegetable oil.

8. The method of claim 1, wherein the mixture further comprises up to 1.5 parts of calcium.

9. The method of claim 8, wherein the calcium is provided by calcium carbonate or calcium triphosphate.

10. The method of claim 1, wherein the mixture further comprises one or more vitamins, trace elements, sodium chloride colorings, or flavorings.

11. An expanded cereal prepared by the method of claim 1.

12. The expanded cereal of claim 11, wherein the cereal is coated with one or more of a chocolate coating, a sugar syrup, a fruit syrup, a honey syrup, or a coating that contains one or more vitamins or flavorings.

13. The method of claim 1 wherein the die includes a cylindrical distribution chamber having a front wall and a rear wall for distributing the thermoplastic substance to the extrusion tubes and a cylindrical distribution insert that extends axially from the center of a feed ring towards the front wall but is spaced from the array of tubes.

14. The method of claim 1, wherein the array of extrusion tubes includes between about 12 to 30 tubes.

15. The method of claim 1, wherein the extrusion tubes have a cross sectional shape comprising one or more of a circle, oval, polygon, triangle, square, rectangle, or trapezoid.

16. The method of claim 1, wherein the extrusion tubes are aligned along one or more axes or curves when viewed in cross section.

17. The method of claim 1, wherein the dimensions of the cross section of each extrusion tube is between about 1 and 4 mm.

18. The method of claim 1, wherein the area of the cross section of each extrusion tube is between about 1 and 16 $mm^2$.

19. The method of claim 1, wherein the distance between any two adjacent extrusion tubes is between about 0.2 and 0.6 mm.

20. The method of claim 1, wherein the extrusion tubes are arranged in the array in two groups with parallel intersecting axes.

21. The method of claim 1 which is conducted in an extruder comprising an elongated barrel, one or two processing screws within the elongated barrel, the extrusion die, and a cutting means.

22. The method of claim 21, wherein the extruder comprises more than one die; each extrusion die includes a feed ring for distributing the thermoplastic substance to the extrusion tubes; the elongated barrel has an upstream end and a downstream end, with the downstream end of the barrel secured to a front plate provided with an orifice that is in communication with the barrel, and the front plate being attached to a second plate having an opening that is in communication with the orifice of the front plate; and a bell-shaped pre-distribution chamber attached to the second plate and in communication with the opening of the second plate and with the feed rings of the extrusion dies; and the cutting means is a rotary cutter that rotates against the outlet orifices of the extrusion tubes.

* * * * *